United States Patent Office 2,744,394
Patented May 8, 1956

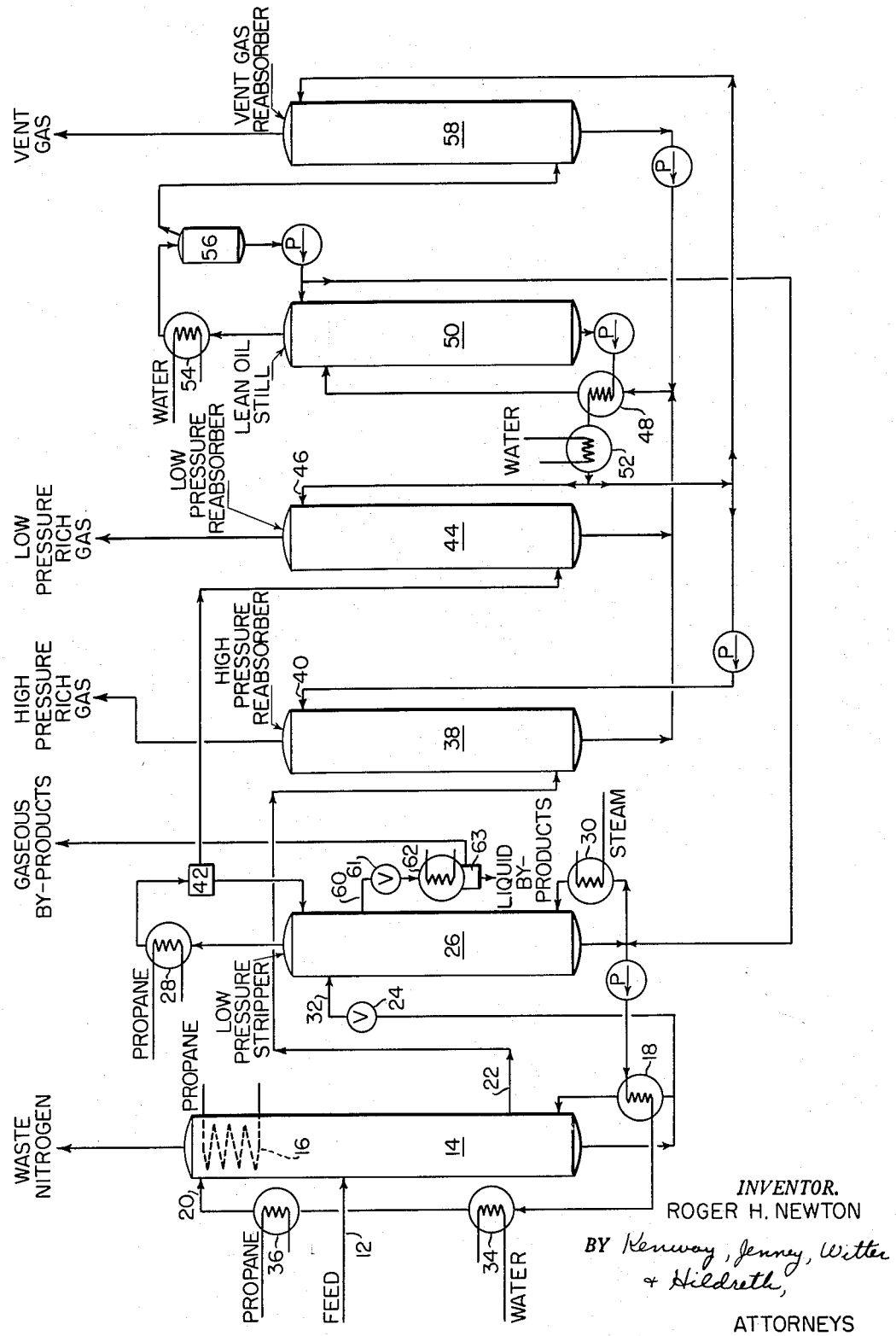

2,744,394

SEPARATION OF GASEOUS MIXTURES BY FRACTIONATION

Roger H. Newton, Winchester, Mass., assignor to Badger Manufacturing Company, Cambridge, Mass., a corporation of Massachusetts Application June 2, 1953, Serial No. 359,110

7 Claims. (Cl. 62—175.5)

The present invention relates to the separation of gaseous mixtures, and more particularly to a process involving the use of an extractive selected for the properties of its binaries with the respective components.

The conventional processes involving distillation of separate substances of differing volatility have been the subject of long continued investigation, and are well understood. Essentially, these processes involve the phenomena existing under conditions in which a liquid and a vapor of the initial mixture can coexist in equilibrium.

The conditions of temperature and pressure requisite to distillation may be explained with reference to the vapor pressure characteristics of the respective components. Each component, in the pure state, has a vapor pressure curve defined as the locus delimiting the vapor and liquid regions on the temperature-pressure plane. The curve is discontinuous at a point termed the "critical point," which defines the extreme of temperature and pressure at which the vapor and liquid states become indistinguishable.

Assuming a simple binary system for illustration, it is well known that the distillation characteristic takes the form of a loop bounded on the lower side by a "dew point curve" and on the upper side by a "bubble point curve." The two curves converge at an extremity termed the "critical point" of the system. The region between the curves defines the conditions in which liquid and vapor coexist in equilibrium, these being also the conditions requisite to distillation.

It is useful to make certain generalizations with regard to the distillation characteristic of the binary mixture. Generally, the critical point occurs at higher values of pressure than for either of the components in the pure form. For a mixture of the components of not too different vapor pressure characteristics (e. g., methane and ethane or propane as contrasted with hydrogen-propane), the critical pressure may exceed those of the components by perhaps 50 percent and the critical temperature may be between those of the respective components.

Straightforward fractionation therefore requires that the pressure be reduced below the critical value for the system, and that the temperature at the overhead be reduced to a value intermediate the critical values for the pure components. Within the range of possible values, the choice of conditions is further governed by the desire for large relative volatility (i. e., ratio of percent concentration of the more volatile component in the vapor to that in the liquid), as well as by the desire for high thermodynamic efficiency in the condensation of the lighter component, where substantial refrigeration is required. Generally, the pressure ordinarily selected for fractionation is well below the critical since relative volatility decreases as the critical pressure is approached. In hydrocarbon separations where condensation may require considerable refrigeration, this is at the expense of some efficiency in refrigeration, since the quantity of heat per mol which must be extracted to condense the more volatile component in a two phase system decreases as the critical pressure is approached.

Although the above statements have reference to a binary system, they are shown in practice to be generally true with reference to higher order systems, although precise information as to such systems is not yet available.

This invention has as its principal object the attainment of separations under conditions which are either wholly outside the conditions requisite to straightforward fractionation, or at least appreciably removed from those determined as above. Such conditions might exist where the mixture to be separated is available at pressures in excess of the critical values, and reduction of pressure for straightforward fractionation must be followed by uneconomical recompression to a high pressure for pipeline transmission or for direct use. Such conditions might also exist where considerable refrigeration costs are entailed by conventional fractionation.

An example occurs in the separation of nitrogen from natural gas. In the transmission of natural gas through pipe lines, there is considerable economic loss by reason of the fact that there may be 10 percent to 15 percent by volume of nitrogen in the gas, the nitrogen being an inert constituent that takes up pipe volume and requires pumping power. The natural gas may be available at pressures of the order of 1,000 p. s. i. a. The critical pressure for the nitrogen-methane system is about 730 p. s. i. a. Conventional fractionation at the source would be carried out, for example, at 550 p. s. i. a. This would correspond with an overhead having a temperature of about −220° F. and rejecting 85 or more percent nitrogen. Considerable energy would be required not only to pump the rich gas back up to the transmission pressure (e. g., 1,000 p. s. i. a.), but also to hold down the overhead temperature.

In terms of practical application, it is therefore another object of the invention to reduce the cost of separating certain gaseous mixtures such as those heretofore mentioned. In the case of natural gas, this results in rendering economical the utilization in pipe transmission systems of sources having higher nitrogen concentrations.

A further object is to afford means for recovering valuable components which are present in small quantities in the natural gas, such as ethane, propane, and butane, as an incident to the separation of nitrogen and methane.

With these and other objects in view, a principal feature of the present invention resides in the use of an extractive, which in the preferred embodiment is introduced as reflux and later stripped from the rich products of fractionation. The extractive is selected as one having binaries with the components to be separated, which binaries will have co-existing liquid and vapor phases in the desired pressure range and at temperatures within the reach of commercial refrigeration. The invention should be clearly distinguished from other processes involving the use of third substances to facilitate the separation, such as azeotropic and extractive distillations. In contrast with the former, the present process utilizes extractives which do not form azeotropes with any of the initial components, and in contrast with the latter, the extractive is not used to control the volatility of a component.

Other features and objects will be more clearly understood from the following description of a preferred process according to the invention. These include procedures, arrangements, adjustments, and controls as hereinafter stated and specifically defined in the claims.

The drawing is a flow diagram for the preferred process as applied to the extraction of nitrogen from natural gas.

At its source, natural gas contains a large percentage of methane contaminated with more or less nitrogen, as well as small quantities of acidic gases such as carbon dioxide and hydrogen sulfide, water vapor, and heavier hydrocarbons such as ethane, propane and butane. It is useful to follow through an example having 12 percent by volume of nitrogen, at a pressure of somewhat more than 1,000 p. s. i. g. This is to be treated continuously at the source before transmission at the available pressure.

Prior to treatment, according to this invention, the acidic gases are removed by scrubbing with an amine solution in a manner well known to those skilled in the art, and the water vapor content is removed in a conventional manner by passing the gas over activated solid alumina. Other methods of accomplishing these ends are known, but the choice of method has no significance with reference to this invention.

The high pressure purified gas at 12 is led into the mid-section of a bubble cap plate fractionating tower 14 having multiple trays. The pressure within the tower is maintained at substantially inlet pressure. Above the inlet 12 the tower is preferably equipped with an integral reflux condenser 16 cooled by propane boiling at atmospheric pressure. A reboiler 18 is heated in any suitable manner, being illustrated in the figure as a part of the pentane return system hereinafter described. Low pressure steam would also be suitable as a heat source for the reboiler.

Means are provided for adding an extractant liquid to the top of the column at 20, and for withdrawing gaseous product at a point 22 intermediate the feed plate and the base of the column. In the illustrated case, the extractant is added to the reflux condenser, thus providing an advantageous method of securing good contact between the incoming extractant and the outgoing gas at the desired reflux temperature. It will be apparent, however, that an external condenser might also be used.

The extractant liquid is chosen as n-pentane, since mixtures of pentane and nitrogen and of pentane and methane each form two-phase systems at the given pressure within the column, and furthermore, at a convenient reflux temperature of $-40°$ F. (to be contrasted with $-220°$ F. and a pressure of 550 p. s. i. a. for conventional nitrogen-methane distillation). The relatively high reflux temperature is readily and economically reached with propane refrigerant.

The amount of extractive to be added at the stated pressure is adjusted so that the composition of tower bottoms lies within the two-phase binary region at the selected pressure. At approximately 1,000 pounds pressure, it was found that this amount must lie within the range between .53 and 3.3 mols per mol of methane in the feed.

It was further found that when the quantity of extractant was adjusted to about 10 mols per mol of overhead vapor, and when the quantity of heat furnished was adjusted so that the liquid in the base of the column contained about 23% methane, and further, when the amount of cooling applied to the reflux condenser was adjusted to maintain a top column temperature of $-40°$ F., the following products were obtained:

Feed—12% (vol.) nitrogen, at 1,020 p. s. i. a.
Overhead—95% (vol.) nitrogen, 0.2% (vol.) pentane, at 1,000 p. s. i. a.
Sidestream—98.1% (vol.) methane, 0.4% (vol.) nitrogen, 0.7% (vol.) pentane, at 1,000 p. s. i. a.
Bottoms—liquid containing 23% methane, a small amount of ethane and heavier hydrocarbons recovered from the crude gas, and added pentane.

The loss of pentane in the overhead gas is sufficiently low under the stated conditions that reabsorption or other secondary recovery techniques may not be required to render the process economical, but it will be clear that these may be utilized if desired.

The liquid product from the base of the high pressure fractionator 14 is reduced in pressure to about 400 p. s. i. g. through a valve 24 and fed into a bubble cap plate stripping column 26 having eighteen plates. (A sidestream valve on this column, hereinafter referred to, is assumed to be closed.) This column is equipped with a reflux condenser 28, suitably cooled by a propane refrigeration cycle to maintain a top column temperature of 0° F. A reboiler 30 for the base liquid is suitably heated by high pressure steam. Under these conditions, all of the liquefied methane in the feed at 32 is vaporized overhead, together with the small amounts of ethane, propane and heavier components recovered from the crude gas, and some added pentane. As bottoms, essentially pure n-pentane is collected, and this is cooled and returned to the high pressure fractionator as extractant liquid. The cooling is preferably accomplished by first transferring a part of the heat to the reheater 18 as previously described, then by passing the pentane successively through a water heat exchanger 34 and a propane heat exchanger 36.

In order to attain the best possible recovery and thereby to have the most economical operation, the two denitrogenized gas streams, from the sidestream of the fractionator 14 at 22 and from the overhead of the stripper, are sent to re-absorbers which scrub out the remaining pentane. The sidestream at 22 passes to the base of a high pressure absorption column 38, which is of conventional bubble cap plate construction wherein the gases are contacted countercurrently at ordinary temperatures of 70 to 100° F. with a light absorption oil having a molecular weight of about 150. The reflux oil fed in at 40 is pumped from a lean oil still as hereinafter described. High pressure rich gas is available at the overhead.

In a similar manner, the overhead gas from the stripper 26 is fed through a valve 42 to the base of a low pressure absorption column 44 similar to the column 38. At similar temperatures, but at low pressure, the pentane is removed and low pressure rich gas is available at the overhead. The reflux oil fed in at 46 is derived from the same source which supplies the reabsorber 38.

The rich absorption oil from the bottoms of the reabsorbers 38 and 44 is fed through an exchanger 48 to a lean oil still or oil stripper 50 to regenerate a pentane-free lean oil as bottoms. The lean oil is cooled by a water exchanger 52 and returned to the reabsorbers. The operation of the still 50 is conventional and needs no further description.

The pentane recovered overhead from the stripper 50 is contaminated by propane, butanes and pentanes present in the original gas, and may be sent to a natural gasoline plant, which is generally part of a natural gas field installation. There, it would be separated into its components, and the n-pentane would be returned to the nitrogen removal system. Alternatively, as illustrated in the drawing, the pentane may be passed through a reflux condenser 54 cooled by water, into a drum 56. From the drum 56 it may pass to a vent gas reabsorber 58 similar to the reabsorbers 38 and 44, and which preferably operates at about 50 p. s. i. a. and 100° F. There, the n-pentane is recovered as bottoms and returned to the still 50, while the propane and butanes are removed as overhead.

As previously stated, the liquid bottoms from the fractionator 14 contains 23% methane under the stated conditions, and in addition it will contain over 95% of the ethane, propane, butane and heavier hydrocarbons present in the crude gas, and added pentane. For the components present in the crude gas, the percentages in the bottoms are typically as follows:

1.9% (mol) ethane
0.6% (mol) propane
0.6% (mol) butane and heavier.

These components represent considerable value, especially in high volume installations, and it may be desirable to recover substantially all of them, in addition to removing the nitrogen.

To this end, the foregoing process may be modified as follows. The operation of the fractionator 14 is the same as previously described. The bottoms are sent to the stripper 26, which, for purposes of this modification is provided with a vapor sidestream connection at a point 60 between the feed tray and the reboiler. For this purpose a valve 61 is opened. By proper adjustment of the heat input, reflux rate, and sidedraw rate, the overhead composition is found to be:

Nitrogen—less than 0.1% (vol.)
Methane—97% (vol.)
Ethane and heavier—less than 0.5% (vol.)
Pentane—2.5% (vol.)

The sidestream contains, in addition to about 15% pentane and 5% methane, substantially all of the ethane, propane and butane present in the original crude gas.

The sidestream is passed through a refrigerated condenser 62 and into a separator 63 from which liquid pentane is removed by partial condensation, the remaining gases being drawn off at the top of the separator. Alternatively, the separation may be accomplished by partial flash or by rectification in accordance with established practices. The particular procedure to be employed for this separation forms no part of this invention, and may be determined by the application of well known principles.

It will be understood that whereas the invention has been described with reference to a specific procedure as employed in the separation of natural gas, it is by no means narrowly limited thereto. Variations of the process and of the arrangements and procedures herein described, which will occur to those skilled in this art in the light of the teachings herein, would not constitute a departure from the spirit or scope of the invention.

Having thus described the invention, I claim:

1. A method for separating nitrogen from raw natural gas, including subjection of the gas to continuous fractionation with addition as reflux of n-pentane, the pressure being adjusted to a value in excess of critical for the nitrogen-methane binary and at which two phases exist for the binaries of pentane with each of nitrogen and methane, the temperature range and the amount of reflux added being adjusted to remove substantially all of the nitrogen overhead, continuous withdrawal as bottoms of a liquid containing methane and pentane, and continuous withdrawal of a sidestream immediate between the raw gas inlet and the bottoms consisting of substantially pure methane.

2. A method for separating nitrogen from raw natural gas, including the steps of subjecting the gas to fractionation with addition as reflux of n-pentane, the pressure being adjusted to a value in excess of critical for the nitrogen-methane binary and at which two phases exist for the binaries of pentane with each of nitrogen and methane, withdrawal as bottoms of a liquid containing methane and pentane, withdrawal of a sidestream intermediate between the raw gas inlet and the bottoms consisting of substantially pure methane, and subsequent stripping of said bottoms for removal of the pentane and return thereof as reflux in the preceding step.

3. A method for separating nitrogen from raw natural gas and thereafter separately recovering the components thereof heavier than methane, including the steps of subjecting the gas to fractionation with addition as reflux of n-pentane, the pressure being adjusted to a value in excess of critical for the nitrogen-methane binary and at which two phases exist for the binaries of pentane with each of nitrogen and methane, withdrawal as bottoms of a liquid containing methane and pentane, withdrawal of a sidestream intermediate between the raw gas inlet and the bottoms consisting of substantially pure methane, and subsequent stripping of said bottoms for removal of the pentane as bottoms, said stripping including withdrawal of a vapor sidestream containing substantially all of said components present in the raw gas.

4. A method of separating a pair of components of raw natural gas or of mixtures containing said components at a pressure in excess of the critical value for the binary of said components, including subjection of the gas to multistage fractionation at said pressure by countercurrent contact between liquid and vapor, the liquid being produced at least in part by condensation through removal of heat from the stages of lowest temperature and the vapor being produced at least in part by addition of heat to the stages of highest temperature, said fractionation including addition to the reflux of an extractive hydrocarbon, said extractive and the conditions of fractionation being selected and adjusted to permit coexistence of two-phase systems of said extractive and each of said components, said process being carried on with continuous recovery at the overhead of a product rich relative to the feed in one component and at a higher temperature stage of a product rich relative to the feed in the other component.

5. A method of separating nitrogen from raw natural gas at a pressure in excess of the critical value for the nitrogen-methane binary, including subjection of the gas to multistage fractionation at said pressure by countercurrent contact between liquid and vapor, the liquid being produced at least in part by condensation through removal of heat from the stages of lowest temperature and the vapor being produced at least in part by addition of heat to the stages of highest temperature, said fractionation including addition to the reflux of an extractive hydrocarbon having at least four carbon atoms, the composition of said extractive, the rate of addition thereof and the conditions of fractionation being selected, controlled and adjusted to permit coexistence of two-phase systems of said extractive and both nitrogen and methane, said process being carried on with continuous recovery at the overhead of a product rich relative to the feed in nitrogen and at a higher temperature stage of a product rich relative to the feed in methane.

6. A method for separating nitrogen from raw natural gas, including subjection of the gas to multistage fractionation by countercurrent contact between liquid and vapor, the liquid being produced at least in part by condensation through removal of heat from the stages of lowest temperature and the vapor being produced at least in part by addition of heat to the stages of highest temperature, said fractionation including addition to the reflux of n-pentane, the pressure being adjusted to a value in excess of critical for the nitrogen-methane binary and at which two phases exist for the systems of pentane and both nitrogen and methane, the rate of addition of n-pentane and the conditions of fractionation being independently adjusted to permit continuous recovery at the overhead of a gas rich relative to the feed in nitrogen and at a higher temperature stage of a gas rich relative to the feed in methane.

7. The method as specified in claim 6 wherein the rate of addition of n-pentane to the reflux is between 1.0 and 3.0 mols per mol of feed gas.

References Cited in the file of this patent

UNITED STATES PATENTS

| Number | Name | Date |
|---|---|---|
| 2,067,349 | Schuftan | Jan. 12, 1937 |
| 2,295,211 | Hall | Sept. 8, 1942 |
| 2,516,507 | Deming | July 25, 1950 |
| 2,529,312 | Rupp | Nov. 7, 1950 |
| 2,596,785 | Nelly et al. | May 15, 1952 |
| 2,603,310 | Gilmore | July 15, 1952 |
| 2,608,270 | McDonald et al. | Aug. 26, 1952 |
| 2,610,704 | Patterson | Sept. 16, 1952 |
| 2,662,049 | Magor et al. | Dec. 8, 1953 |